(12) United States Patent
Settle

(10) Patent No.: US 8,070,029 B1
(45) Date of Patent: Dec. 6, 2011

(54) TRUCK BED COMPANION

(76) Inventor: Michelle Settle, Canton, OH (US)

(*) Notice: Subject to any disclaimer, the term of this patent is extended or adjusted under 35 U.S.C. 154(b) by 500 days.

(21) Appl. No.: 12/009,855

(22) Filed: Jan. 22, 2008

Related U.S. Application Data

(60) Provisional application No. 60/886,342, filed on Jan. 24, 2007.

(51) Int. Cl.
*B60R 9/00* (2006.01)
*B60R 5/00* (2006.01)
*B60P 7/135* (2006.01)

(52) U.S. Cl. ........ 224/403; 224/521; 224/523; 224/500; 224/551; 410/121; 296/37.6

(58) Field of Classification Search .......... 224/403, 224/405, 917.5, 500, 523, 521, 551; 410/121, 410/129, 140; 296/37.6
See application file for complete search history.

(56) References Cited

U.S. PATENT DOCUMENTS

| | | | | | |
|---|---|---|---|---|---|
| 3,912,139 | A | * | 10/1975 | Bowman | 410/3 |
| 3,995,565 | A | * | 12/1976 | Kersey | 410/151 |
| 4,236,854 | A | * | 12/1980 | Rogers | 410/121 |
| 4,595,246 | A | * | 6/1986 | Bross | 312/348.3 |
| 4,772,165 | A | * | 9/1988 | Bartkus | 410/139 |
| 4,917,429 | A | * | 4/1990 | Giger | 296/37.6 |
| 5,423,463 | A | * | 6/1995 | Weeks | 224/42.33 |
| 5,427,487 | A | * | 6/1995 | Brosfske | 410/121 |
| 5,516,245 | A | * | 5/1996 | Cassidy | 410/101 |
| 5,603,439 | A | * | 2/1997 | Pineda | 224/403 |
| 5,697,742 | A | * | 12/1997 | House | 410/127 |
| 5,845,953 | A | * | 12/1998 | Rusnock | 296/37.6 |
| 6,077,007 | A | * | 6/2000 | Porter et al. | 410/140 |
| 6,174,116 | B1 | * | 1/2001 | Brand | 410/140 |
| 6,726,076 | B1 | * | 4/2004 | Hernandez | 224/675 |
| 2006/0186157 | A1 | * | 8/2006 | Dibble | 224/405 |

* cited by examiner

*Primary Examiner* — Justin Larson
*Assistant Examiner* — Lester L Vanterpool
(74) *Attorney, Agent, or Firm* — Daniel Boudwin

(57) ABSTRACT

Truck Bed Companion will keep groceries from spilling all over the truck bed, allow contractors to transport tools and sheets of plywood or drywalls with ease, eliminate the need to ties down lawn mowers or gas cans and create separate areas for tool boxes, saws or other necessities.

2 Claims, 6 Drawing Sheets

TRUCK BED COMPANION

CROSS REFERENCE TO RELATED APPLICATION

This application claims benefits of provisional patent application No. 60/886,342 filed on Jan. 24, 2007.

BACKGROUND OF THE INVENTION

While trucks are used to transport various types and sizes of cargo, their open-bed design can create problems. Smaller, lightweight items can roll and slide when the truck is in motion. Larger cargo can crush or break other items and many things need to be tied down before the vehicle is moved. All of this can be an inconvenience to the driver.

BRIEF SUMMARY OF THE INVENTION

The Truck Bed Companion is an organizer that compartmentalizes any truck bed. Easy to install or remove, Truck Bed Companion prevents cargo from rolling around and eliminates the needs to tie down items such as lawn mowers or gas cans. With the Truck Bed Companion, items will not roll, slide or break and small items do not need to be removed from the bed before larger cargo is transported. Truck Bed Companion is adjustable and able to accommodate any size truck bed. It does not require tools and installation will not permanently damage the vehicle. Truck Bed Companion is a helpful accessory for commercial, industrial and residential use.

DETAILED DESCRIPTION OF DRAWINGS

Figure 1:
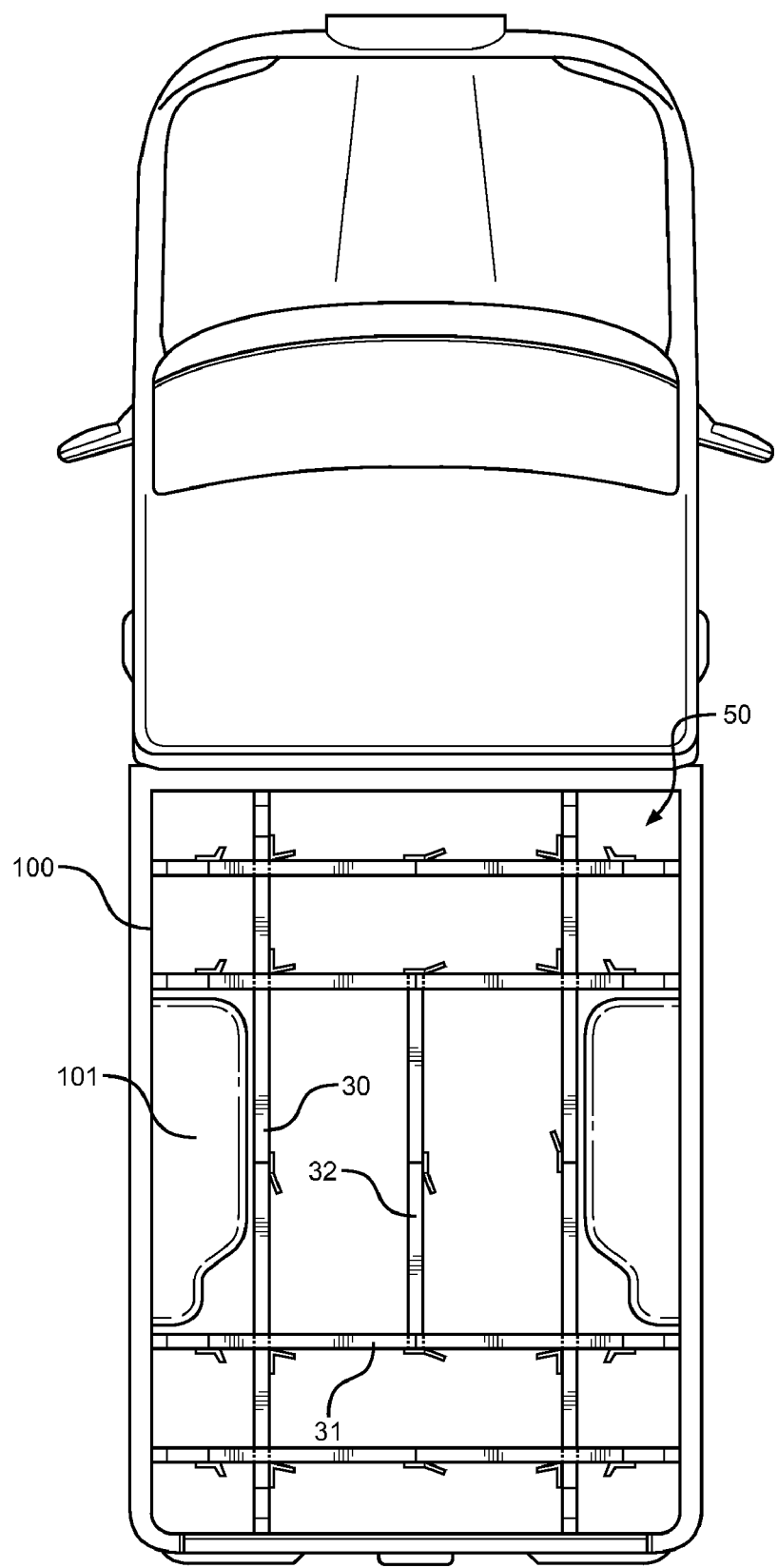
FIG. 1 shows a top view of the organizer installed in a pickup truck bed.

With reference now to FIG. 1, there is shown a top view of the organizer 50 installed inside the truck bed 100. Two main beams 30 are shown running from the cab section of the truck to the back of the bed and passing proximate to the bed's wheel wells 101. The center beam 32 is shown spanning a distance between two adjacent cross beams 31. A total of four cross beams 31 are shown in the FIG. 1 configuration, but it should be realized that various combinations of beams can be used to create different layouts.

Figure 2:
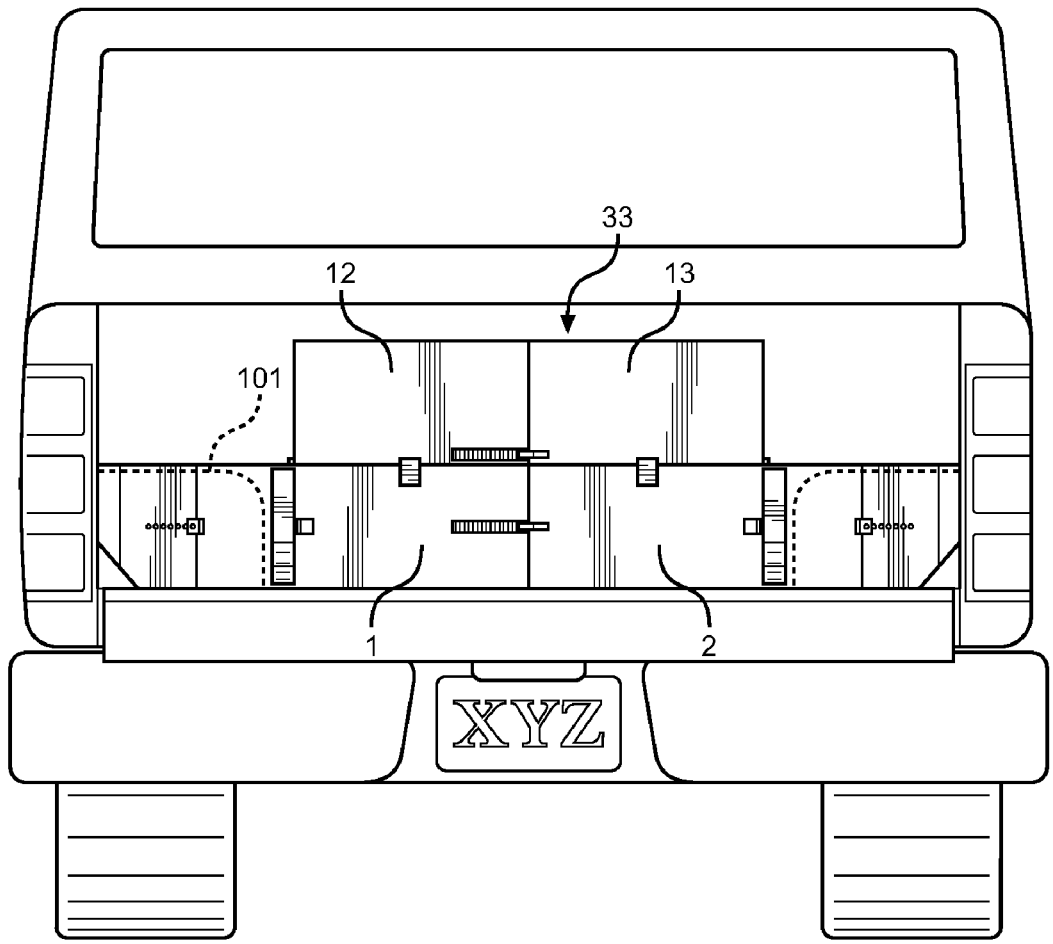
FIG. 2 shows the organizer from the rear of a pickup truck.

FIG. 2 shows a view from the rear of the truck. Cutouts 3 on the cross beams 31, for the main beams 30 to pass through, are shown proximate to the wheel wells 101. An extension beam 33 with telescopically adjustable left side 12 and right side 13 is shown sitting on the top surface of a cross beam 31. FIG. 2 also shows that the beams rise to a height above the wheel wells 101 and continue down to the base of the truck bed 100 in order to form a barricade that prevents objects from rolling out of their designated compartment.

Figure 5A:
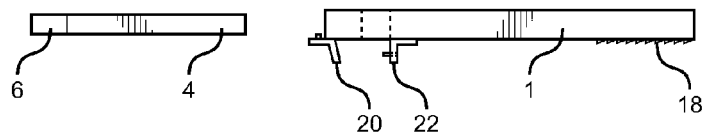
FIG. 5 shows an exploded view of a cross beam, with FIG. 5a showing a top view of the left side and FIG. 5b showing a top view of the right side.
Figure 5:
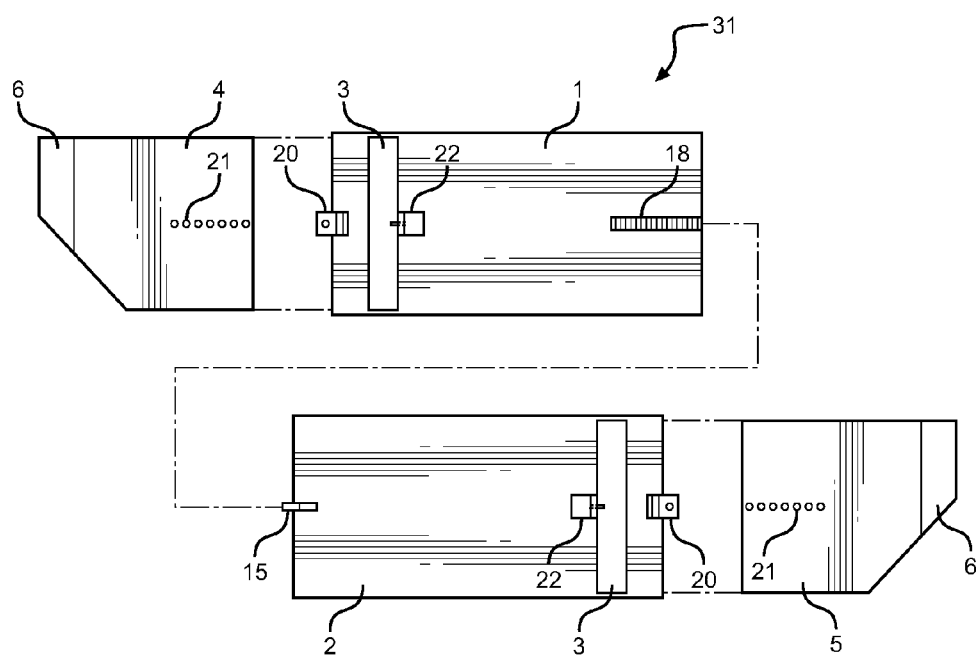

FIG. 5 shows an exploded view of a cross beam 31. The cross beam 31 is split in the center to form a left side 1 and right side 2. The left side 1 telescopically slides into the right side 2. The tooth rail 18 on the front surface of the left side 1 latches with the tooth rail latch 15, which is located on the front surface of the right side 2. Each side 1, 2 has a cutout 3 large enough for the main beams 30 to pass through. The main beams 30 should lie as close to the wheel wells 101 as possible in order to have the most usable space in the truck bed 100. Therefore, the cross beams 31 are telescopically adjustable until the cutouts 3 locate proximate to the wheel wells 101. This feature allows the organizer 50 to fit trucks with various spaces between wheel wells.

Different trucks have different width wheel wells as well as different lengths between the left and right wheel wells. In order to accommodate various sizes, and ensure that the organizer fits properly against the sides of the truck bed 100, each cross beam 31 is split again at a location to the outside of the cutouts 3. The second split breaks each cross beam 31 up into a left end 4 and a right end 5. The end members 4, 5 telescopically slide into the side members 1, 2. Each end member 4, 5 has a plurality of holes 21 through its cross section. A pin latch 20 on the outer end of each side member 1, 2 of the cross beam 31 engages with the holes 21 to lock the end members 4, 5 to the side members. At the outer ends of each end member 4, 5 are rubber boots 6 for protecting the truck bed and ensuring a tight fit of the organizer 50.

Figure 5B:
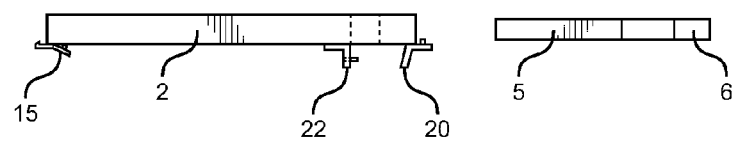

FIGS. 5a and 5b show top views of the left and right sides members 1, 2 and ends members 4, 5. A clearer understanding of the location of the tooth rail 18 and tooth rail latch 15, the pin latch 20 for joining the end 4, 5 and side 1, 2 members, and the pin latch 22 for joining the cross beams 31 to the main beams 30, can be seen from these views.

Figure 6A:
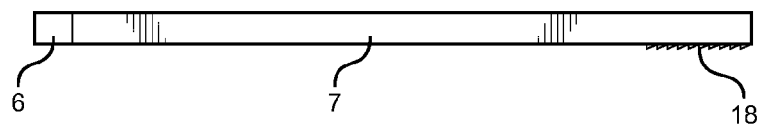
FIG. 6 shows an exploded view of the main beam, with FIG. 6a showing a top view of the left side and FIG. 6b showing a top view of the right side.
Figure 6:
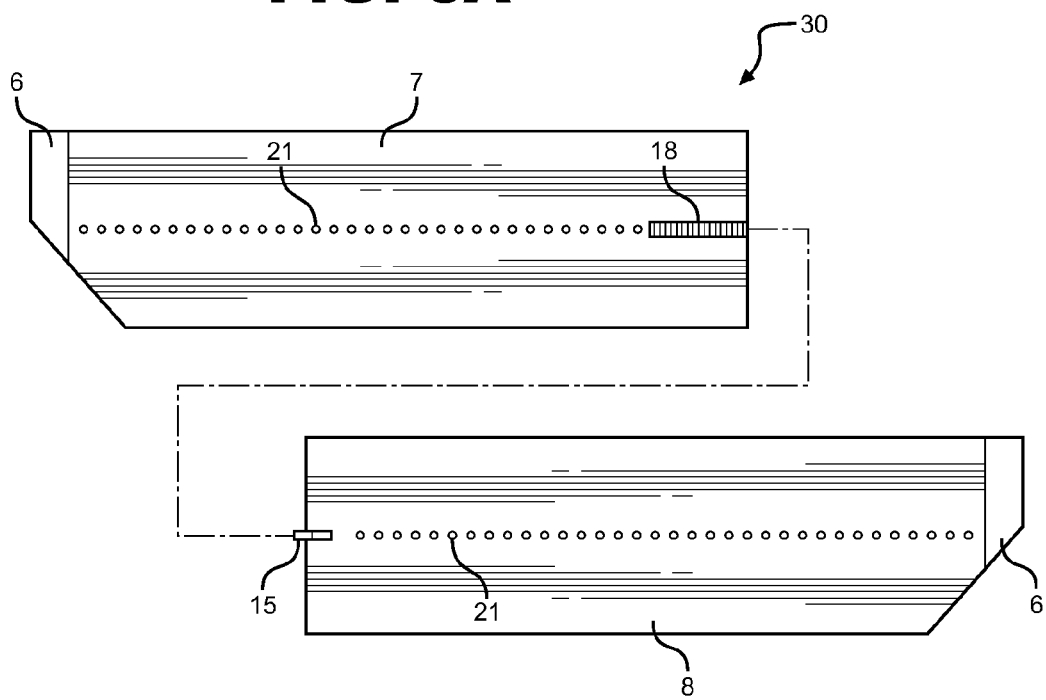
Figure 6B:
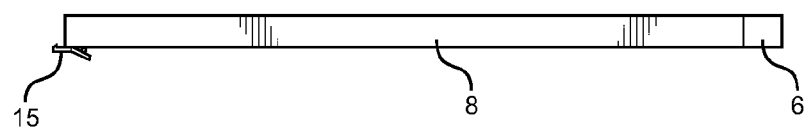

FIG. 6 shows an exploded view of a main beam 30. At the center of the main beam 30 is the same tooth rail 18 and tooth rail latch 15 as the cross beams 31. As with the cross beams 31, the main beam 30 has a left side 7 and right side 8, wherein the left side 7 is telescopically slidable into the right side 8. At the outer ends of the left and right sides 7, 8 are the same rubber boots 6 as used with the cross beams 31. These rubber boots 6 will butt up against the front and rear sides of the truck bed 100 to ensure no damage is done to the bed and that the organizer 50 has a tight fit.

The main beams 30 pass through the cutouts 3 in the cross beams 31. Along the length of the main beams 30 are holes 21 through its cross section. Located on the cross beams 31, on the inner side of the cutouts 3, are pin latches 22. The pin latches 22 will latch with a hole 21 in the main beam 30 to lock the organizer 50 together.

Figure 4:
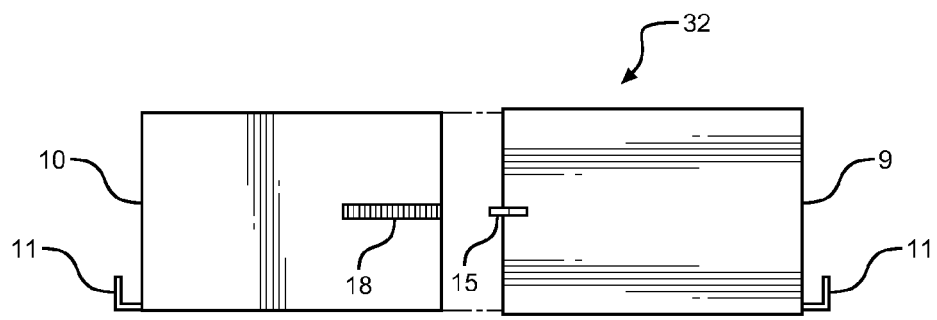
FIG. 4 shows a front view of the center beam, with FIG. 4a showing a top view.
Figure 4A:
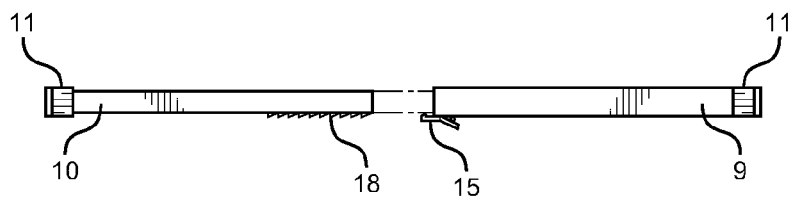

The organizer can be further divided by using a center beam 32 to split the middle compartment in two. FIGS. 4 and 4a show the detail embodiments of the center beam. At the center of the center beam 32 is the same tooth rail 18 and tooth rail latch 15 as the cross beam 31. As with the cross beams 31, the center beam 32 has a left side 10 and right side 9, wherein the left side 10 is telescopically slidable into the right side 9. At each end of the center beam 32 are center beam hooks 11. The center beam hooks 11 are inserted under two adjacent cross beams 31, as shown in FIG. 1. Alternatively, the center beam hooks 11 can be installed under two adjacent main beams 30. The center beam 32 can be telescopically adjusted to fit the length between the two adjacent beams.

Figure 3:
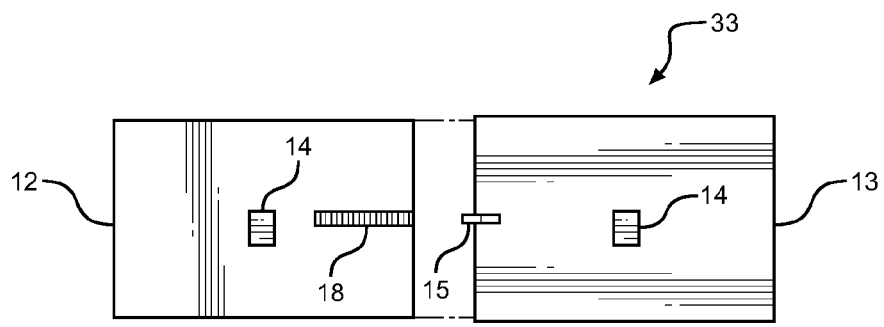
FIG. 3 shows a front view of the extension beam, with FIG. 3a showing a top view and FIG. 3b showing a side view.
Figure 3A:
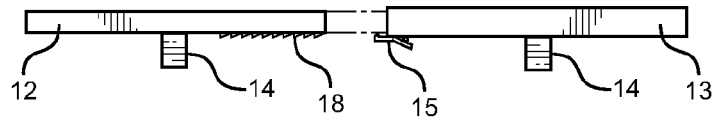
Figure 3B:
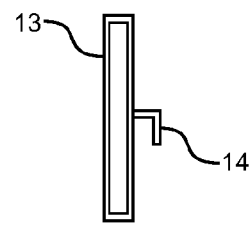

To accommodate taller objects, an extension beam 33 can be installed, as shown in FIG. 2. FIG. 3 3-3B show the detailed embodiments of the extension beam. At the center of the extension beam 33 is the same tooth rail 18 and tooth rail latch 15 as the cross beam 31. As with the cross beams 31, the extension beam 33 has a left side 12 and right side 13, wherein the left side 12 is telescopically slidable into the right side 13. On the front surface of the extension beam are two hooks 14. To raise the height of a section of a cross beam 31, a main beam 30, or the center beam 32, the hooks 14 on the extension beam 33 are attached to the top of a cross beam 31, main beam 30, or center beam 32. FIG. 2 illustrates the use of an extension beam 33 on a cross beam 31.

Figure 7:
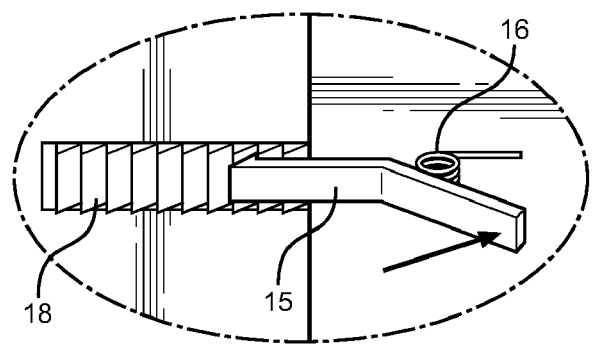
FIG. 7 shows the tooth rail and tooth rail latch.

FIG. 7 shows the tooth latch assembly in the center of all beams 30, 31, 32, 33 including the tooth rail 18, tooth rail latch 15, and spring 16. The tooth rail latch 15 is secured to the right side 2, 8, 9 or 13 of the beams by a spring 16. The tooth rail latch 15 will engage the tooth rail 18 as the left side 1, 7, 10, or 12 is telescopically slid into the right side 2, 8, 9 or 13. Applying pressure, as indicated by the arrow, will cause the tooth rail latch 15 to disengage the tooth rail 18.

Figure 8:
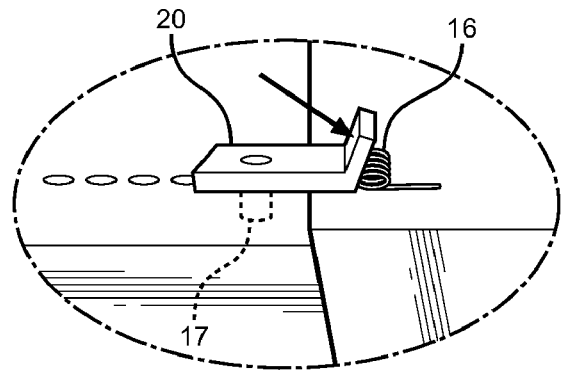
FIG. 8 shows the end pin hole latch joining the side to end members of the cross beams.
Figure 9:
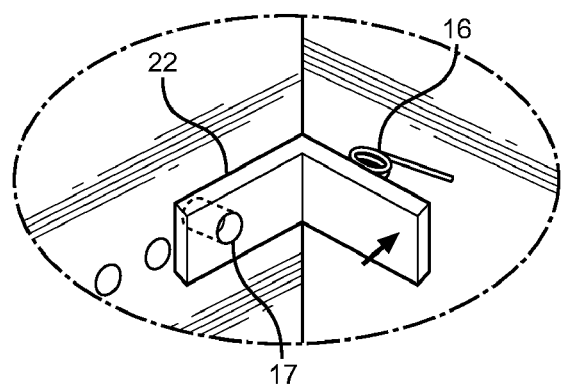
FIG. 9 shows the corner pin hole latch joining the main and cross beams.

FIG. 8 shows the end pin latch 20. The end pin latch 20 is connected by a spring 16 to the left and right side members 1, 2 of the cross beams 31. A pin 17 on the latching end of the latch 20 is inserted into a pin hole 21 on an end member. Positive pressure, as indicated by the arrow, causes the pin hole latch 20 to disengage the pin holes 21. The corner pin hole latch 22, as shown in FIG. 9, is attached to the cross beams 31 on the inner side of the cutout 3 by a spring 16. A pin 17 on the latching end of the latch 22 engages a pin hole 21 on the main beams 30. Positive pressure, as indicated by the arrow, causes the pin hole latch 22 to disengage.

In use, the beams can be laid out in the truck bed using as little as one beam. If one beam is used, the beam should be extended until pressure on the ends against the truck bed holds it secure. For multiple compartments, the horizontal beams can be laid out first. The center of the beams should be adjusted until the cutouts locate proximate the wheel wells. Next, the ends of the cross beams should be extended to butt up against the sides of the truck bed. If the center beam is desired, it should be hooked beneath two adjacent cross beams. With the cross beams installed, the main beams can be slid forward, towards the truck's cab, through the cutouts in the cross beams. The main beams will now lay immediately next to the wheel wells, thus maximizing the size of the compartments. The main beams should be extended to butt up against the front and rear sides of the truck bed. If additional height is required, the extension member can be hooked on top of any beam and extended or retracted to the desired length.

I claim:

1. A truck bed organizer having multiple expansion joints to fit various size truck beds, comprising:
a plurality of cross beams being extendable in length, wherein said cross beams have a center location with a break, forming right and left sides of said beams; said left and right sides being telescopically connected and extendable, wherein a tooth rail and tooth rail latch mechanism locks said left and right sides together; said left and right sides having a cutout, wherein said cross beam is telescopically extended until each of said cutouts locate proximate to a wheel well in said truck bed; said left and right sides of said cross beams being further separated into left and right ends relative to said truck bed; said left and right ends being telescopically extendable in order to fit a length from said cutout to an interior side of said truck bed, wherein a pin latch locks said ends to said sides; rubber boots cover said ends for butting up against said truck bed;
a plurality of main beams being extendable in length to run between a front and rear side of said truck bed, wherein said main beams have a center location with a break, forming right and left sides of said beams; said left and right sides being telescopically connected and extendable, wherein a tooth rail and tooth rail latch mechanism locks said left and right sides together; said main beams pass through said cutouts in said cross beam and align proximate to said wheel wells; rubber boots cover ends of said sides for butting up against said truck bed;
said main beams having a plurality of holes wherein a pin latch located on said cross beams proximate to said cutouts locks said main beams to said cross beams;
said main and cross beams having a height greater than said wheel wells, wherein said beams extend from said height above said wheel wells to a base of said truck bed to form a barricade to an object in said organizer;
an extension beam for increasing the height of a selectable portion of any of said crossbeams, main beams, or center beams;
said extension beam having clamps disposed on a front side for removably securing said extension beam to any area along an upper side of any of said crossbeams, main beams, or center beams, thereby increasing a local height of a beam said extension beam is secured to, while leaving a remaining portion of said crossbeam, main beam, or center beam at an original height;
said extension beam having a left and right sides that are telescopically connected and extendable, and a tooth rail and tooth rail latch secured to said left and right sides wherein said right and left sides can be locked together by said tooth rail.

2. The organizer of claim 1, further comprising:
a center beam being extendable in length, wherein said center beam has a center location with a break, forming right and left sides of said beam; said left and right sides being telescopically connected and extendable, wherein a tooth rail and tooth rail latch mechanism locks said left and right sides together; clamps located at bottom ends on said left and right sides for attaching under a lower end of two adjacent beams.

* * * * *